UNITED STATES PATENT OFFICE.

WALTER E. MASLAND, OF WILMINGTON, DELAWARE, ASSIGNOR TO E. I. DU PONT DE NEMOURS POWDER COMPANY, OF WILMINGTON, DELAWARE, A CORPORATION OF NEW JERSEY.

ACETYLATION OF MONOCHLORHYDROCARBONS.

1,077,988.  Specification of Letters Patent.  Patented Nov. 11, 1913.

No Drawing.  Application filed October 19, 1912. Serial No. 726,608.

*To all whom it may concern:*

Be it known that I, WALTER E. MASLAND, of Wilmington, in the county of Newcastle, and in the State of Delaware, have invented a certain new and useful Improvement in the Acetylation of Monochlorhydrocarbons, and do hereby declare that the following is a full, clear, and exact description thereof.

My invention relates particularly to the acetylation of monochlorhydrocarbons, and especially monochlorhydrocarbons derived from hydrocarbons of the paraffin series. It is, however, applicable to the acetylation of many other organic compounds.

The object of my invention is to bring about the acetylation of compounds of the above character, and especially those derived from certain members of the paraffin series of hydrocarbons, in an advantageous manner.

My invention is particularly applicable to obtaining pentyl and hexyl acetates, as well as certain unsaturated hydrocarbons which are formed in the reaction.

The surprising fact, which is a basis of the present application, is that by using acetic acid of from 70 to 99 per cent. substantially the same yields can be obtained as with the use of glacial acetic acid.

As one illustrative embodiment of my invention, I will describe the acetylation of monochlorhydrocarbons derived from pentane and hexane and their isomerids. Assuming that pentane, isopentane, hexane and isohexanes have been obtained by fractionation of a mixture of hydrocarbons such, for example, as gasolene, and that they have been subjected to chlorination by treatment with chlorin in the presence of light to produce monochlorhydrocarbons, and that the products thus obtained are distilled to separate the monochlorhydrocarbons from the remaining products, these monochlorhydrocarbons are subjected to acetylation in the following manner: The monochlorhydrocarbons are placed in a vessel tightly sealed and capable of withstanding a high pressure, together with a quantity of acetic acid and sodium acetate, sufficient of the latter being provided to combine with all the chlorin present. The amount of acetic acid would vary with the nature of the substance treated, but in general it may be stated that an amount is added equal in weight to the monochlorhydrocarbons. I have discovered that the reaction can be effected by the use of sodium acetate. I have also discovered that the acetic acid used may be of any concentration down to 70%, while the literature states that glacial acetic acid (i. e. stronger than 99%) must be used. The vessel is then heated, preferably by a steam jacket, with steam at the ordinary working pressure of about 100 pounds, and then with superheated steam, or steam at approximately 250 pounds pressure, to raise the temperature to about 180° C. or above. The charge should preferably be heated from two to twelve hours, according to the temperature used; the higher the temperature, the shorter the time required. The reaction having been completed, the contents of the vessel are distilled either before or after cooling. The contents of the still are finally subjected to distillation by injected steam in addition to the heating by means of the steam jacket. The acetic acid and oily products are distilled over and separated from each other. The acid thus obtained is concentrated by rectification, and in the process of rectification a small quantity of soluble, oily material is obtained in the first distillate. The oily products of acetylation are then treated to neutralize the same by the addition of sodium carbonate or other alkali. The neutral product thus obtained is used without separation, or it is redistilled to separate it into its various component parts and remove impurities. The purified product will then contain monoacetic esters together with certain unsaturated hydrocarbons of the olefin series, having the same number of carbon atoms as the original chlorhydrocarbons, due to decomposition of some of the chlorhydrocarbons. A molecule of acetic acid will also be produced in the process of acetylation for each molecule of olefin. The desired reaction which takes place is as follows, while some secondary reactions may also occur:

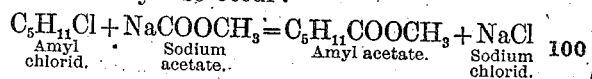

$$\underset{\text{Amyl chlorid.}}{C_5H_{11}Cl} + \underset{\text{Sodium acetate.}}{NaCOOCH_3} = \underset{\text{Amyl acetate.}}{C_5H_{11}COOCH_3} + \underset{\text{Sodium chlorid.}}{NaCl}$$

When the process is carried out in accordance with my invention it can be effected much more cheaply than in the manner in which the process was previously effected. The use of sodium acetate permits a very marked saving in expense and the use of acetic acid of concentrations lower than was previously found possible also effects a very great saving in expense of acid and apparatus. Where acetic acid of low concentration is used, the acid does not attack the walls of the vessel to as great an extent as in the case of the use of acetic acid of higher concentrations.

While I have described my invention above in detail, I wish it to be understood that many changes may be made therein without departing from the spirit of my invention.

I claim:

1. The process which comprises acetylating a halogen derivative of hydrocarbon by an acetate and acetic acid of from 70% to 99% strength.

2. The process which comprises acetylating a chlorhydrocarbon by an acetate and acetic acid of from 70% to 99% strength.

3. The process which comprises acetylating a chlorpentane by an acetate and acetic acid of from 70% to 99% strength.

4. The process which comprises acetylating a halogen derivative of hydrocarbon by sodium acetate and acetic acid of from 70% to 99% strength.

5. The process which comprises acetylating a chlorhydrocarbon by sodium acetate and acetic acid of from 70% to 99% strength.

6. The process which comprises acetylating a chlorpentane by sodium acetate and acetic acid of from 70% to 99% strength.

7. The process which comprises acetylating a mixture of a chlorpentane and a chlorhexane by sodium acetate and acetic acid of from 70% to 99% strength.

In testimony that I claim the foregoing I have hereunto set my hand.

WALTER E. MASLAND.

Witnesses:
C. R. Mudge,
A. M. Gorman.